United States Patent
Montevirgen

(10) Patent No.: US 9,643,349 B2
(45) Date of Patent: May 9, 2017

(54) INSERT MOLDED SPLITS IN HOUSINGS

(71) Applicant: Apple Inc., Cupertino, CA (US)

(72) Inventor: Anthony S. Montevirgen, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 643 days.

(21) Appl. No.: 14/040,481

(22) Filed: Sep. 27, 2013

(65) Prior Publication Data

US 2015/0093527 A1    Apr. 2, 2015

(51) Int. Cl.
*B29C 45/14* (2006.01)

(52) U.S. Cl.
CPC ........ *B29C 45/14467* (2013.01); *B29C 45/14* (2013.01); *Y10T 428/1352* (2015.01)

(58) Field of Classification Search
CPC ............... B29C 45/14467; B29C 45/14; Y10T 428/1352
See application file for complete search history.

(56) References Cited

U.S. PATENT DOCUMENTS

| 6,625,394 | B2 | 9/2003 | Smith et al. |
| 7,377,767 | B2 | 5/2008 | Dubuis et al. |
| 7,684,178 | B2 | 3/2010 | Hsu et al. |
| 7,713,054 | B2 | 5/2010 | Mai |
| 7,798,804 | B2 | 9/2010 | Kmoch et al. |
| 8,380,258 | B2 | 2/2013 | Kim et al. |
| 8,620,395 | B2 | 12/2013 | Kang et al. |
| 8,773,847 | B2 | 7/2014 | Byun et al. |
| 9,229,675 | B2 | 1/2016 | Beeze et al. |
| 9,360,889 | B2 | 6/2016 | Idsinga et al. |
| 2008/0268083 | A1 | 10/2008 | Ferenc |
| 2012/0319907 | A1 | 12/2012 | Wu et al. |

FOREIGN PATENT DOCUMENTS

CN    202540623    11/2012

*Primary Examiner* — Michael C Miggins

(74) *Attorney, Agent, or Firm* — Brownstein Hyatt Farber Schreck, LLP

(57) ABSTRACT

A housing includes first and second housing elements coupled by an insert molded split. The insert molded split includes an injection guide that extends between a first aperture of the first housing element and a second aperture of the second housing element and material injection molded around the injection guide. A method for producing an insert molded split in a housing includes selecting an injection guide, inserting the injection guide into a first aperture of the first housing and the second aperture of the second housing, and injection molded material into and/or at least partially around the injection guide to form the insert molded split.

20 Claims, 16 Drawing Sheets

INSERT MOLDED SPLITS IN HOUSINGS

TECHNICAL FIELD

This disclosure relates generally to insert molding, and more specifically to strengthening insert molded splits in housings.

BACKGROUND

Many devices have housings that include multiple housing elements. In many devices, joints between housing elements may include insert molded splits that join the housing elements. These insert molded splits may be formed by injection molding one or more shots of material.

However, injection molding may not produce insert molded splits with uniform strength throughout. During injection molding, the velocity at which material is injected into areas that do not border surface edges of the housing elements or other components may be higher than the velocity at which material is injected into areas to that do border such edges or other components.

In some cases, the higher velocity portion of the injection may result in the formation of straighter, stronger solidification of the material whereas the lower velocity portion of the injection may result in the formation of more curved, weaker solidification of the material. The weaker areas thus formed may be located in areas more prone to damage by stressing of the housing elements with respect to each other and thus result in a weaker insert molded split than might otherwise be possible.

SUMMARY

The present disclosure discloses apparatuses and methods for producing insert molded splits in housings. A housing may include at least a first housing element and a second housing element coupled by an insert molded split. The insert molded split may include an injection guide that extends between a first aperture of the first housing element and a second aperture of the second housing element. The insert molded split may also include material injection molded around the injection guide.

In a method for producing an insert molded split in a housing, an injection guide may be selected. Utilization of the injection guide in injection molding may produce one or more strength points and/or one or more weaker points at particular locations. The injection guide may be selected with a shape based on such strength and weaker points to correspond to known stresses of a joint formed between a first housing element and a second housing element. Such a shape may be a tube shape, a X-beam shape, an I-beam shape, a cross-beam shape, and/or other shape.

The injection guide may be inserted into a first aperture of the first housing and the second aperture of the second housing. Material may then be injection molded into and/or at least partially around the injection guide to form the insert molded split.

In some cases, an additional material may be injection molded at least partially around the first housing element, the second housing element, the material, and/or the injection guide. The additional material may be molded to have a different orientation than the material. In some cases, the material may be molded to be oriented lengthwise between the first and second housing elements.

In some cases, the material and/or the additional material may include plastic and/or other material. In various cases, the material and/or the additional material may include fibers such as glass fibers, carbon fibers, metallic fibers, and so on. In cases where the material includes fibers, the strength points may correspond to fibers with a straighter orientation than fibers corresponding to the weaker points.

Similarly, in various cases the injection guide may also be formed from materials such as plastic, glass, carbon, metals, and/or other materials. In some cases, the injection guide may be formed of a more rigid and/or stronger material than the material and/or the additional material. The injection guide may also be formed from fibers, such as glass, carbon, metallic, and or other such fibers oriented lengthwise between the first and second apertures, configured in a mesh, and so on.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

The description that follows includes sample apparatuses and methods that embody various elements of the present disclosure. However, it should be understood that the described disclosure may be practiced in a variety of forms in addition to those described herein.

The present disclosure discloses apparatuses and methods for producing insert molded splits in housings. A housing may include first and second housing elements coupled by an insert molded split. The insert molded split may include an injection guide that extends between a first aperture of the first housing element and a second aperture of the second housing element and material injection molded around the injection guide.

In a method for producing an insert molded split in a housing, an injection guide may be selected. The injection guide may be inserted into a first aperture of the first housing and the second aperture of the second housing. Material may then be injection molded into and/or at least partially around the injection guide to form the insert molded split.

Figure 1A:
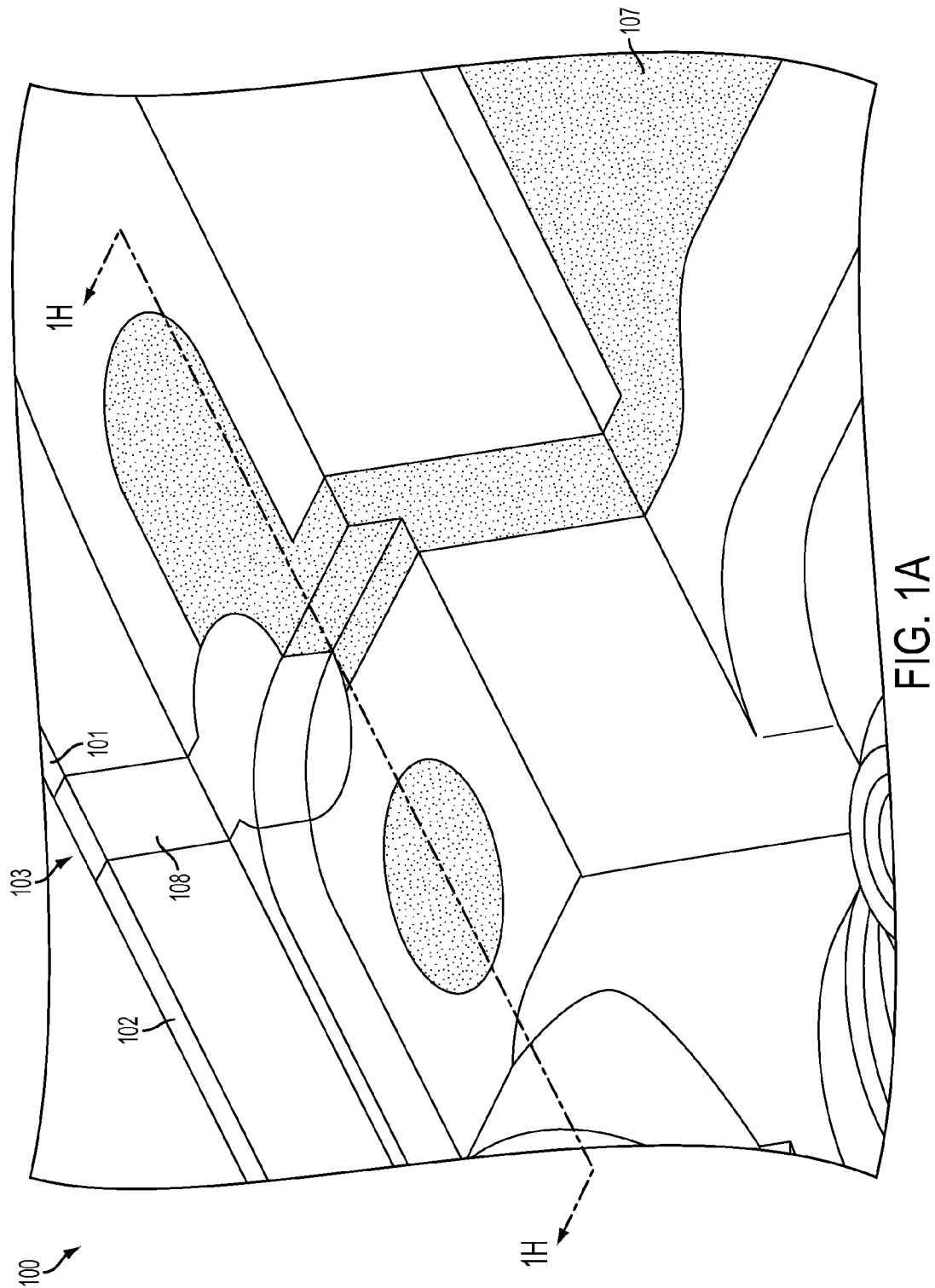
FIG. 1A is an isometric view of an insert molded split.

FIG. 1A is an isometric view of an insert molded split 100. As illustrated, the insert molded split may form a joint between a first housing element 101 and a second housing element 102 utilizing a material 107 and/or an additional material 108 in a gap 103. As also illustrated, the material 107 may have a different orientation than the additional material. Such a different orientation may be perpendicular.

Figure 1B:
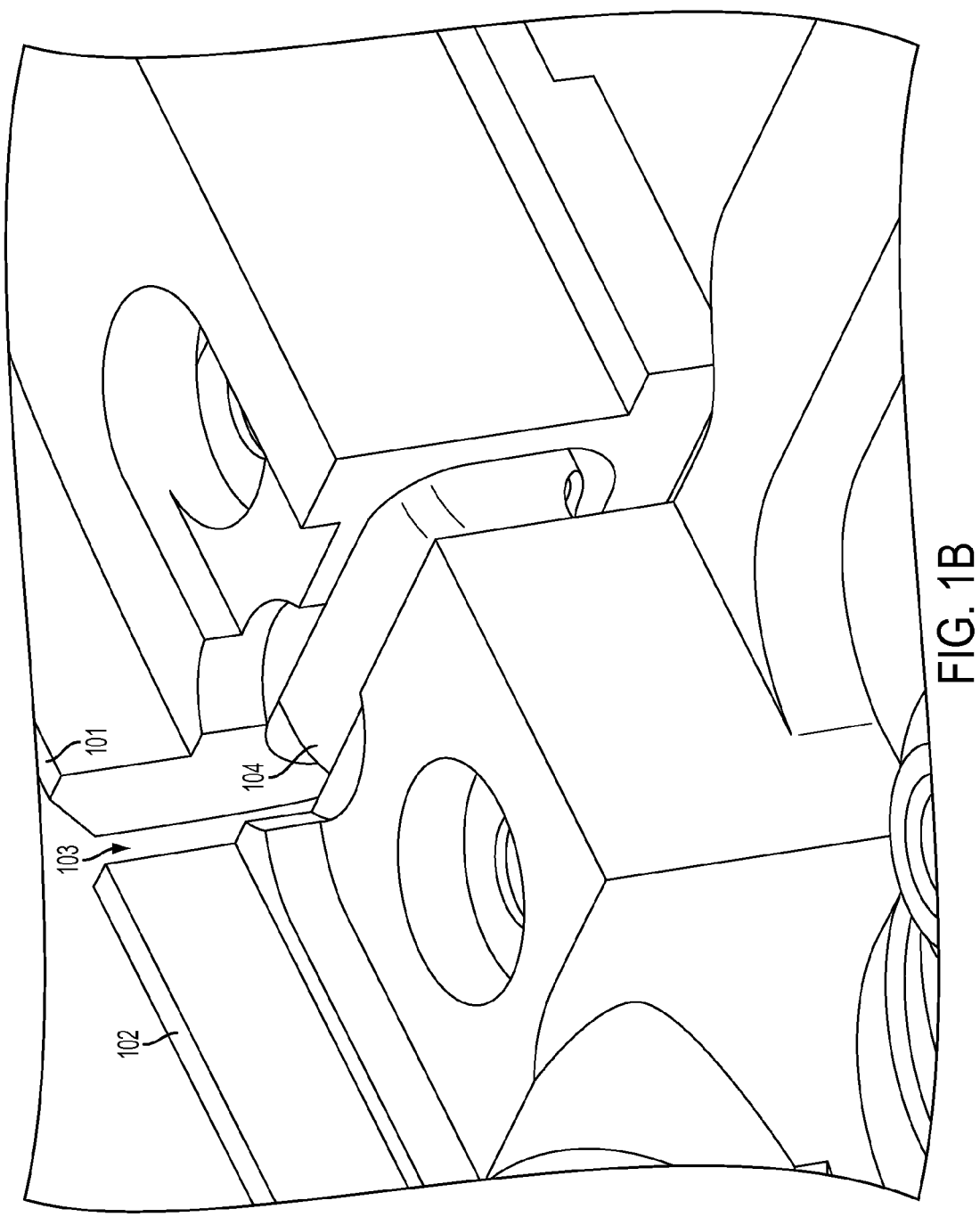
FIG. 1B illustrates an injection guide positioned between the first and second housing elements of FIG. 1A prior to injection molding.

FIG. 1B illustrates an injection guide 104 positioned between the first housing element 101 and the second housing element 102 prior to injection molding. As illustrated, the injection guide may be at least partially inserted into each of the housing elements. The material 107 may then be injection molded into and/or at least partially around the injection guide. An additional material 107 may then be injection molded at least partially around the material, the first housing element, the second housing element, and/or the injection guide.

Figure 1C:
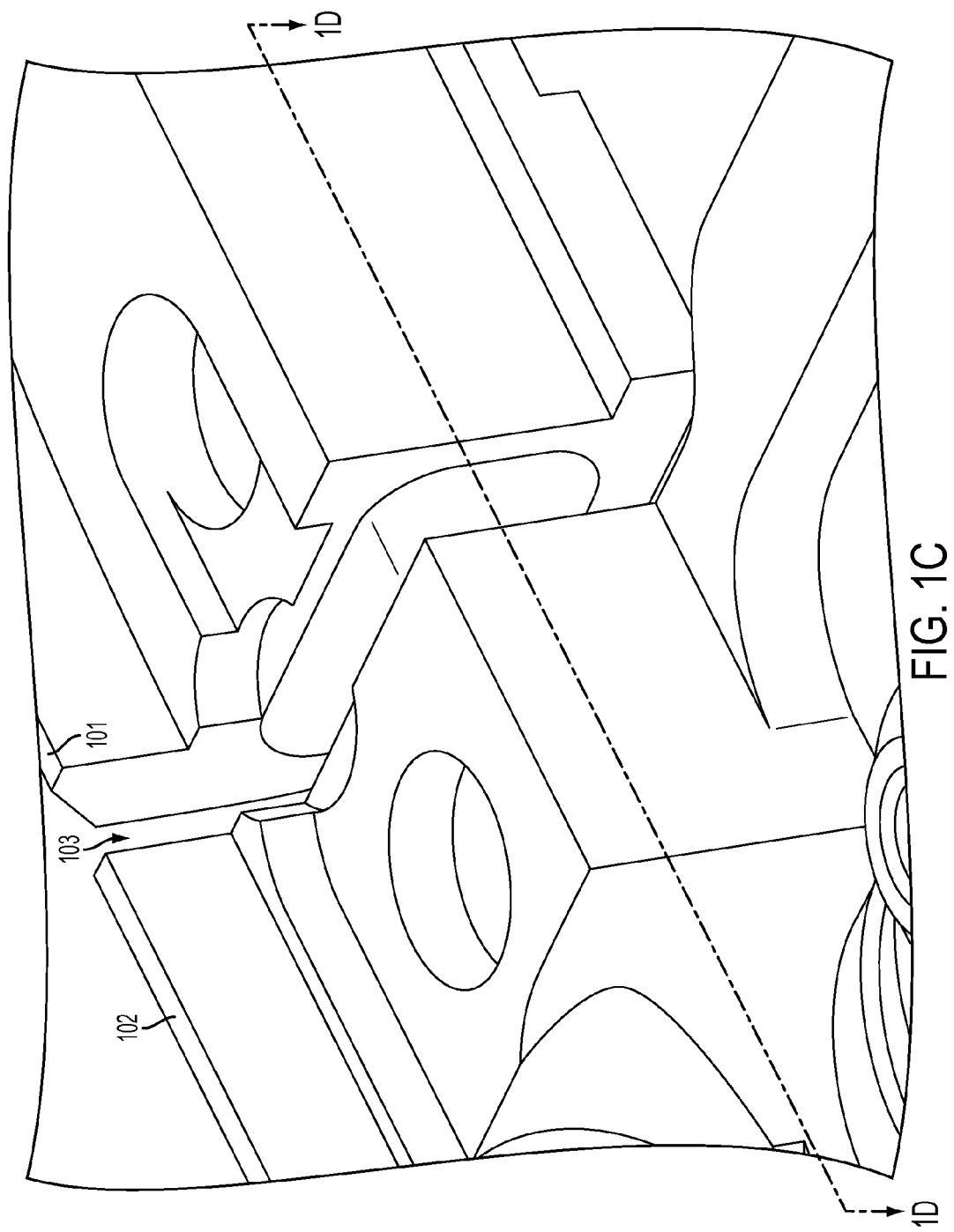
FIG. 1C illustrates FIG. 1B with the injection guide removed.
Figure 1D:
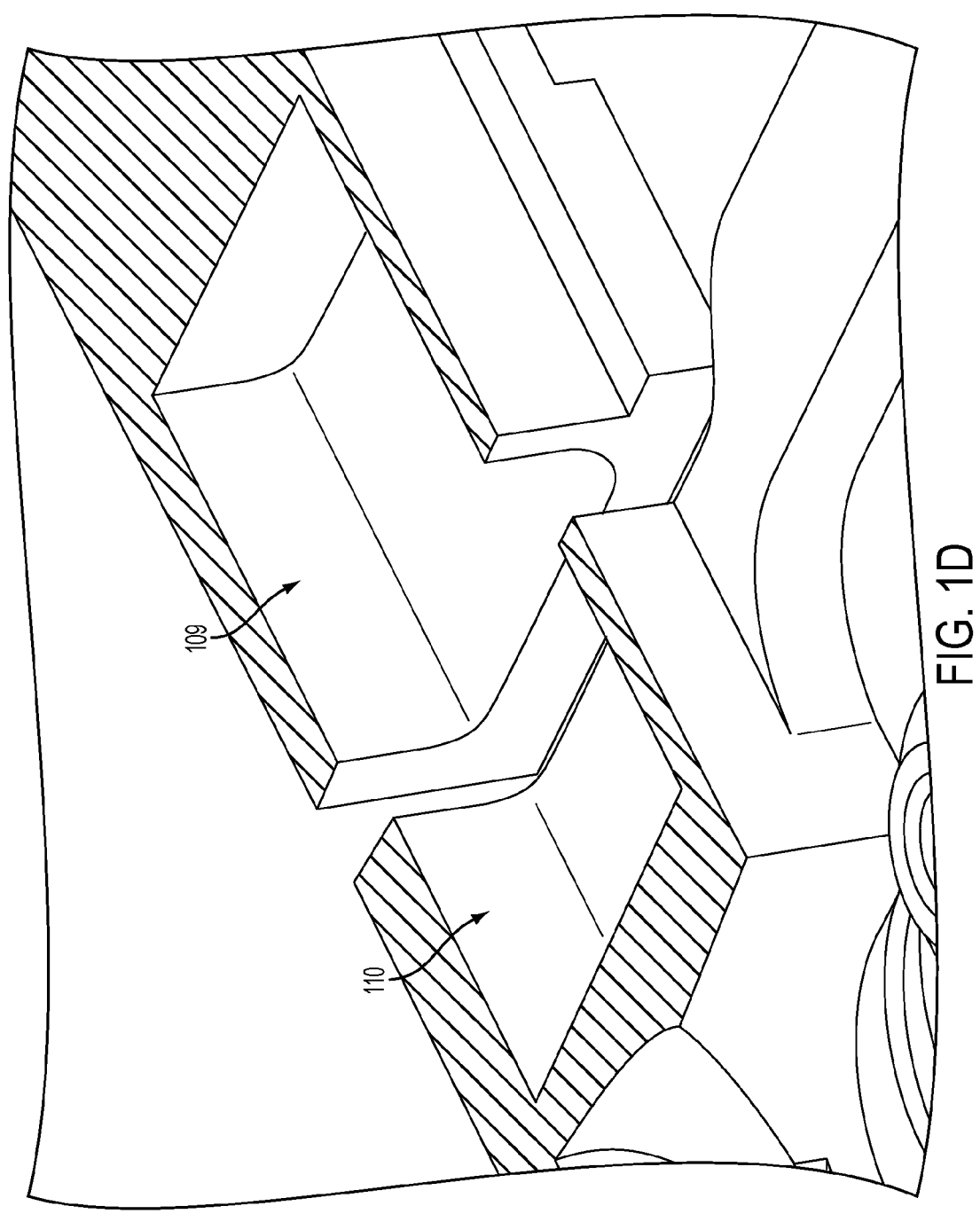
FIG. 1D is a cross-sectional view of FIG. 1B taken along line 1D of FIG. 1B.

FIG. 1C illustrates FIG. 1B with the injection guide 104 removed. FIG. 1D is a cross-sectional view of FIG. 1B taken along line 1D of FIG. 1B. As illustrated, the first housing element 101 may include a first aperture 109 and the second housing element 102 may include a second aperture 110. As illustrated in FIG. 1B, the injection guide may be inserted in these apertures to extend between the first and second housing elements prior to injection molding.

Figure 1E:
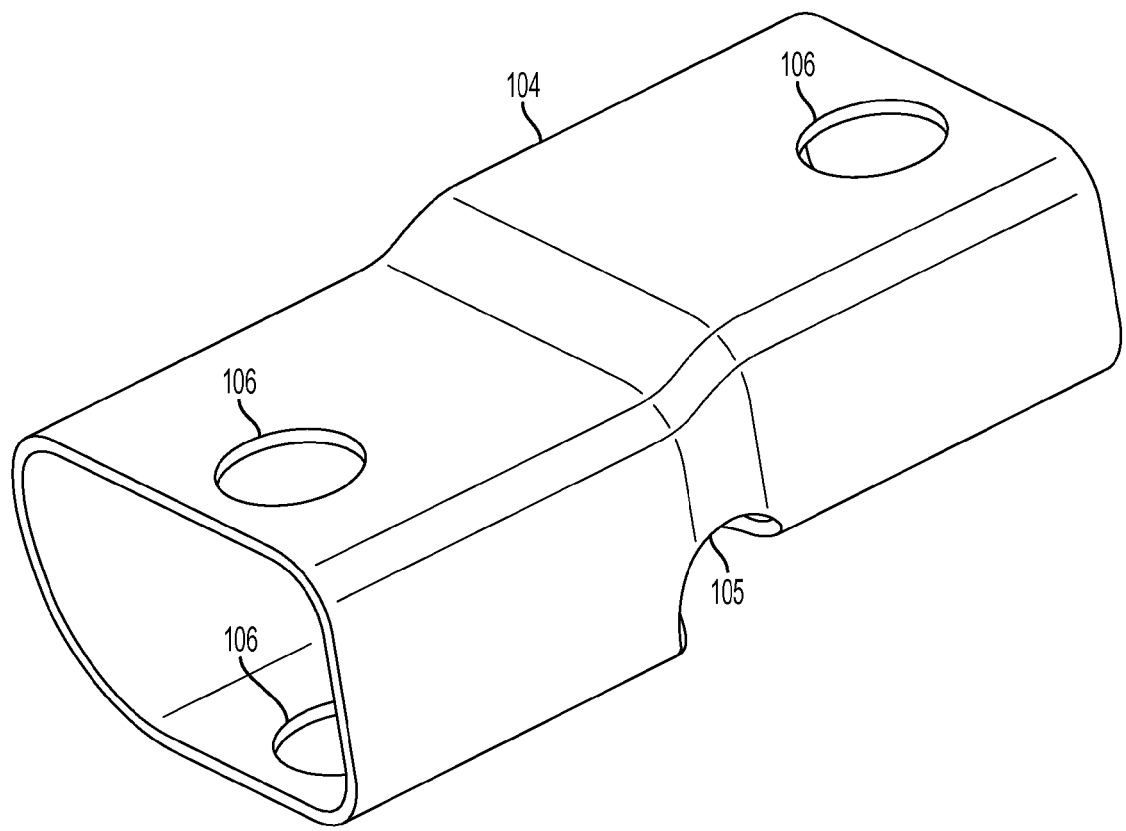
FIG. 1E is an isometric view of the injection guide of FIG. 1A.

FIG. 1E is an isometric view of the injection guide 104 of FIG. 1A. As illustrated, the injection guide may include at least one injection inlet port 105 and one or more injection outlet ports 106. During injection molding, material may be injected into the injection inlet port, fill the injection guide, and flow out of the injection outlet ports to at least partially flow around the injection guide. Thus, the injection guide may guide the material during injection molding. As further illustrated, the injection guide may be tube-shaped.

In some implementations, the injection guide 104 may be configured as shown prior to injection molding. However, in other implementations the injection guide may be at least partially collapsed prior to injection molding and may expand to the configuration shown during injection molding.

Figure 1F:
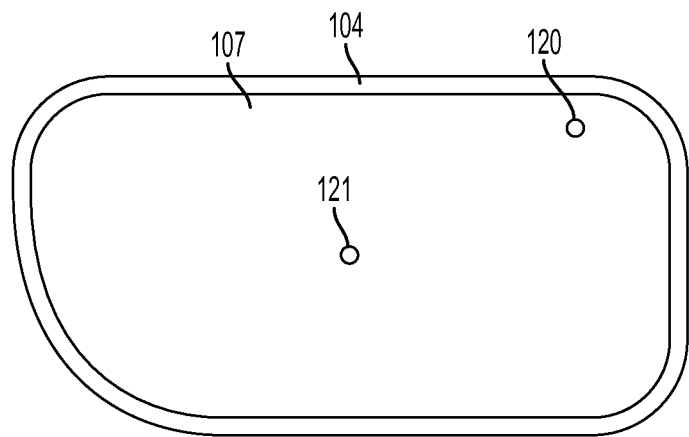
FIG. 1F is a side view of the injection guide of FIG. 1E after injection molding of a material.

FIG. 1F is a side view of the injection guide 104 of FIG. 1E after injection molding of a material 107. Strength point 121 and weaker point 120 are shown formed in the material. Though the two points may be formed of the same material, strength point may be stronger than the weaker point due to the velocity of the material when injected. At the strength point, the velocity of the injected material may have been higher than at the weaker point. This may be because the weaker point is closed to the edge of the injection guide whereas the strength point is further from the edge. As a result of the difference in the injection velocities, the material at the strength point may be formed straighter lengthwise between the lengthwise ends of the injection guide than at the weaker point.

Figure 1G:
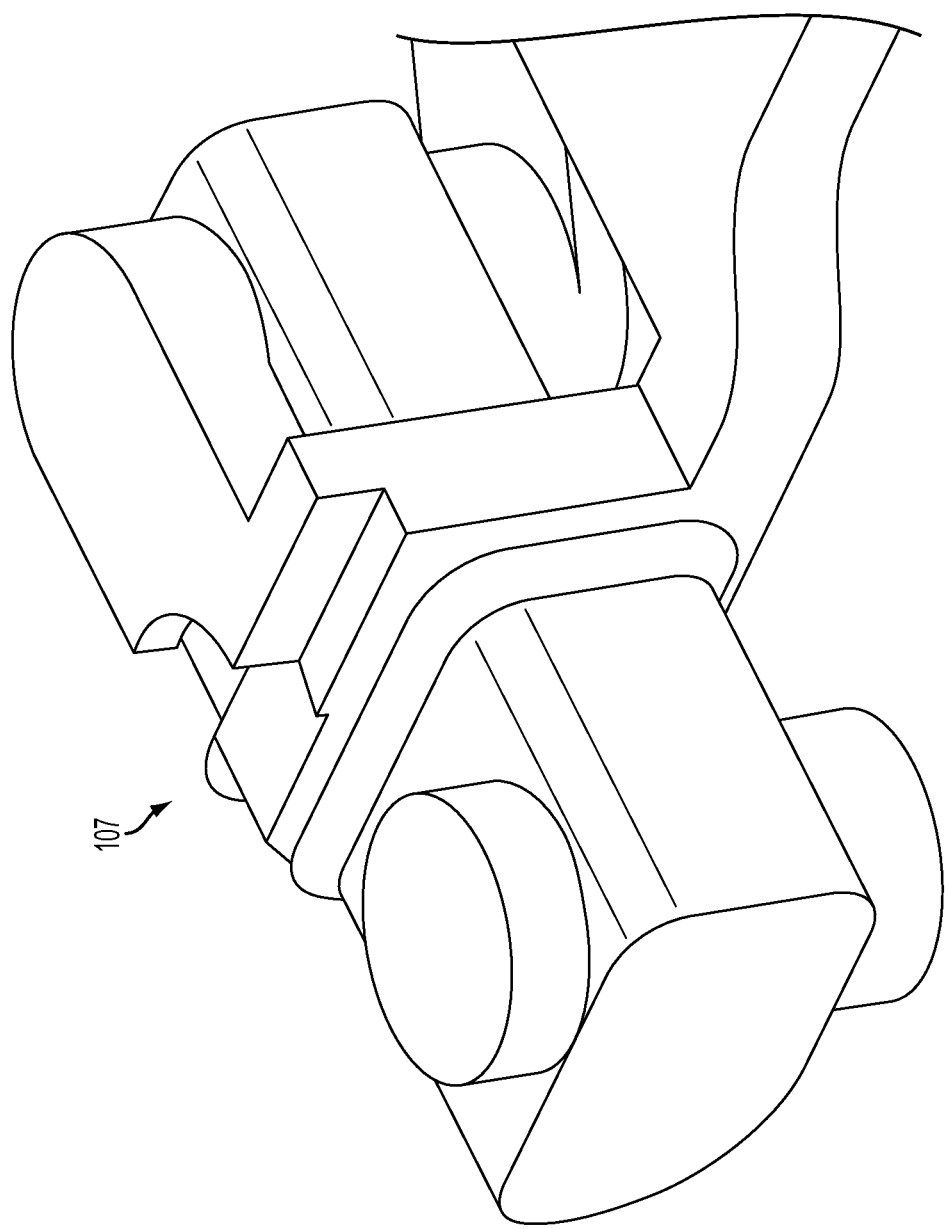
FIG. 1G illustrates the insert molded split of FIG. 1A with the additional material and the first and second housing elements removed.

FIG. 1G illustrates the insert molded split 101 of FIG. 1A with the additional material and the first and second housing elements removed. As illustrated, the injection guide 104 may at least partially covered and/or filled by the material 107.

Figure 1H:
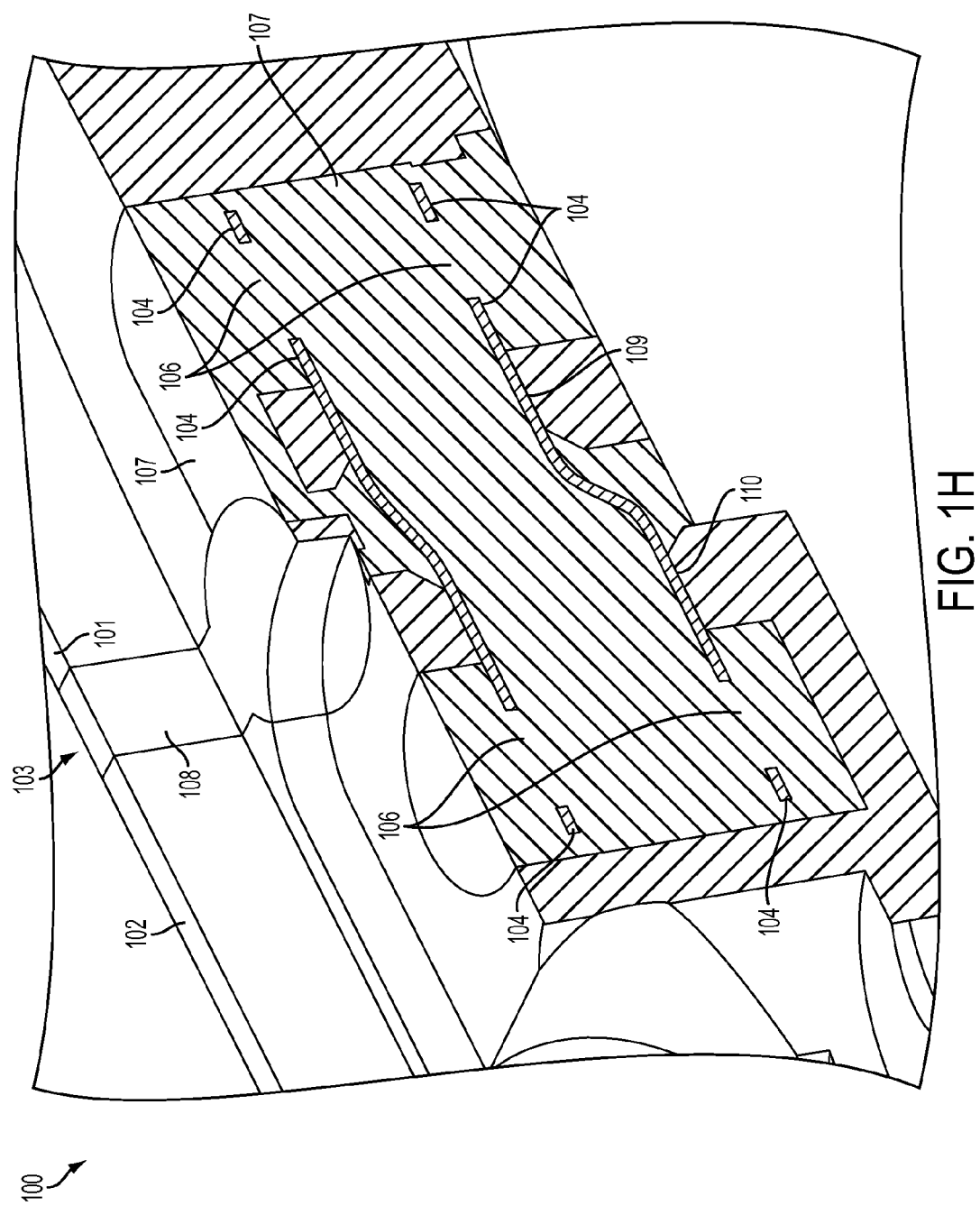
FIG. 1H is a cross-sectional view of FIG. 1A taken along line 1H of FIG. 1A.

FIG. 1H is a cross-sectional view of FIG. 1A taken along line 1H of FIG. 1A. As illustrated, the injection guide may extend between the first aperture 109 and the second aperture 110 and the material 107 at least partially fills and at least partially covers the injection guide 104. As also illustrated, the additional material 108 may at least partially cover the material, the first housing element 101, the second housing element 102, and/or the injection guide.

Figure 1I:
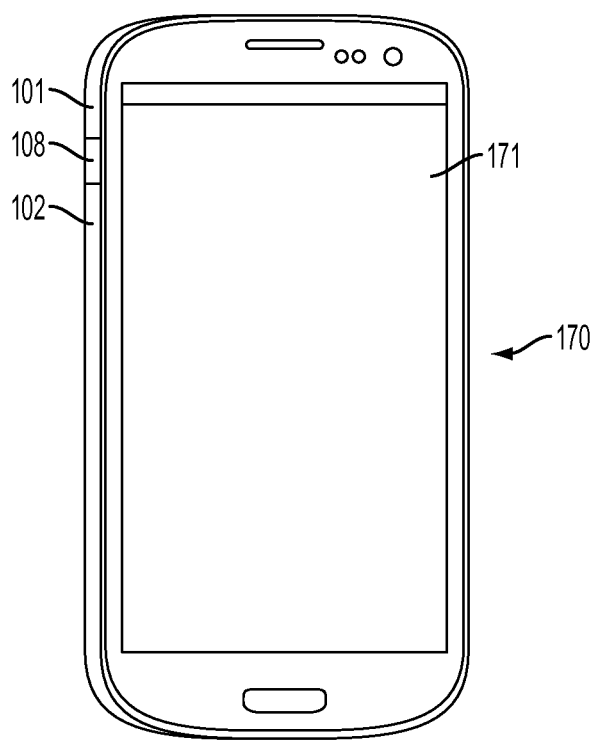
FIG. 1I is an isometric view of an electronic device that includes an insert molded split such as the insert molded split of FIG. 1A.

FIG. 1I is an isometric view of an electronic device 170 that includes an insert molded split such as the insert molded split of FIG. 1A. As illustrated, the electronic device may be a smart phone with a touch screen 171. However, it is understood that this is an example. In various implementations, insert molded splits may be utilized in a variety of items such as laptop computing devices, desktop computing devices, cellular telephones, keyboards, mice, mobile computing devices, wearable devices, tablet computing devices, digital media players, shoes, backpacks, furniture, cameras, microphones, speakers, and/or any other items that have housings with multiple housing elements.

Returning to FIG. 1A, the material 107 and/or the additional material 108 may be a variety of different materials. In some implementations, the material and/or the additional material may include one or more kinds of plastic. However, in other implementations the material and/or the additional material may include any other material that may be utilized in injection molding such as elastomer and so on. In some cases, the material may be a more rigid and/or stronger material than the additional material.

Further, in various implementations the material 107 and/or the additional material 108 may include a variety of fibers. In some cases, the fibers may be rigid fibers such as glass fibers, carbon fibers, metallic fibers, and so on. In such cases where the material includes the fibers, the fibers at the strength point 121 illustrated in FIG. 1F may be straighter lengthwise between the first and second housing elements 101 and 102 than at the weaker point 120.

Returning to FIG. 1B, the injection guide 104 may be a variety of different materials. In some implementations, injection guide may include one or more kinds of plastic, metal, and/or other materials. In some cases the injection guide may be formed of a more rigid and/or stronger material than the material 107 and/or the additional material 108. In such cases, inclusion of the injection guide may provide additional strength to the insert molded split 100.

Further, in various implementations the injection guide 104 may include a variety of fibers. In some cases, the fibers may be rigid fibers such as glass fibers, carbon fibers, metallic fibers, and so on. Such fibers may be configured to be oriented lengthwise with respect to the injection guide (such as to extend between the first aperture 109 and the second aperture 110 when the injection guide is inserted between the first housing element 101 and the second housing element 102), formed in a mesh, and/or otherwise arranged.

In some cases, the strength point 121 may correspond to at least one of the plurality of fibers and the weaker point 120 may correspond to other of the plurality of fibers. In such cases, the fibers corresponding to the strength point may be straighter than fibers corresponding to the weaker point.

Additionally, referring again to FIGS. 1E-1F, the injection guide 104 is illustrated as tube shaped. However, it is understood that this is an example. In various implementations, the injection guide may be configured to have a variety of different shapes. Such shapes may include, but are not limited to, an I-beam, an X-beam, a cross-beam, an irregular shape, and so on.

In some cases, the particular shape of an injection guide 104 that is selected for forming the insert molded split 100 may be based on one or more strength points that will be formed as a result of using the shape in injection molding. Such strength points may be selected in order to ameliorate one or more known stresses of a joint formed by the first and second housing elements 101 and 102.

Figure 2A:
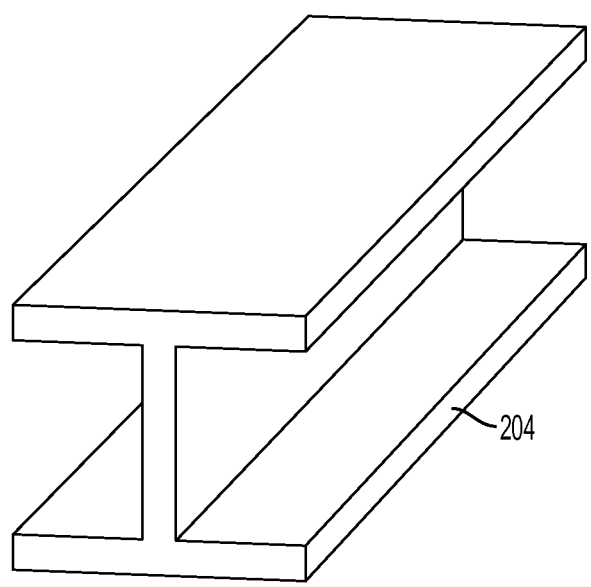
FIG. 2A is an isometric view of a first alternative embodiment of an injection guide that may be utilized in the insert molded split of FIG. 1A.
Figure 2B:
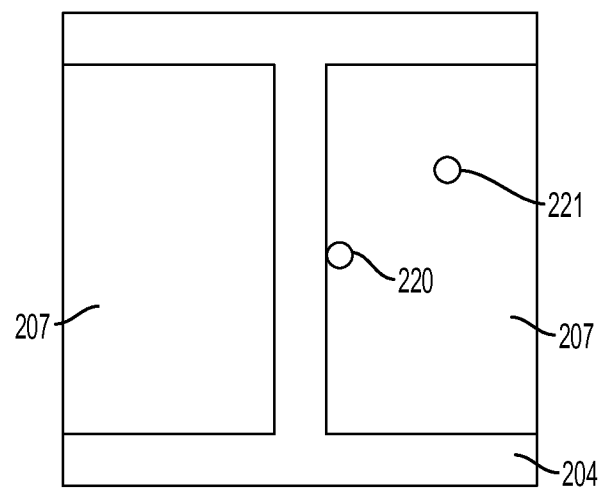
FIG. 2B is a side view of the first alternative injection guide of FIG. 2A after injection molding of a material.

FIG. 2A is an isometric view of a first alternative embodiment of an injection guide 204 that may be utilized in the insert molded split of FIG. 1A. As illustrated, the injection guide 204 is shaped like an I-beam. FIG. 2B is a side view of the injection guide 204 after injection molding of a material. As illustrated, strength point 221 may be formed away from the I-beam of the injection guide 204 and the weaker point 220 may be formed closer to the I-beam of the injection guide 204.

Figure 3A:
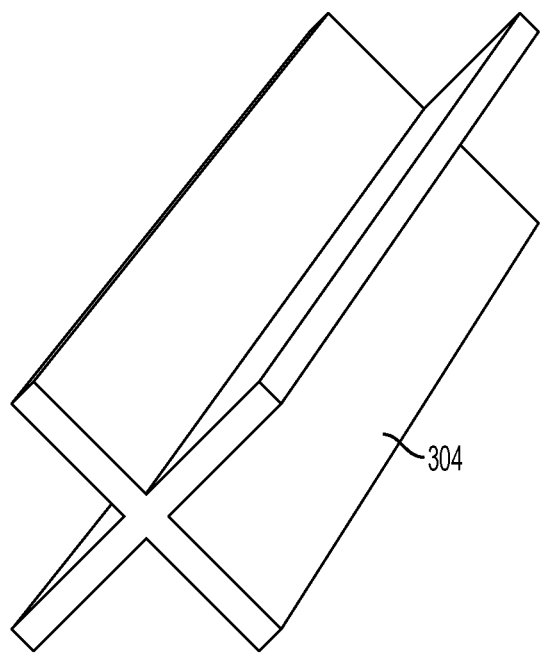
FIG. 3A is an isometric view of a second alternative embodiment of an injection guide that may be utilized in the insert molded split of FIG. 1A.
Figure 3B:
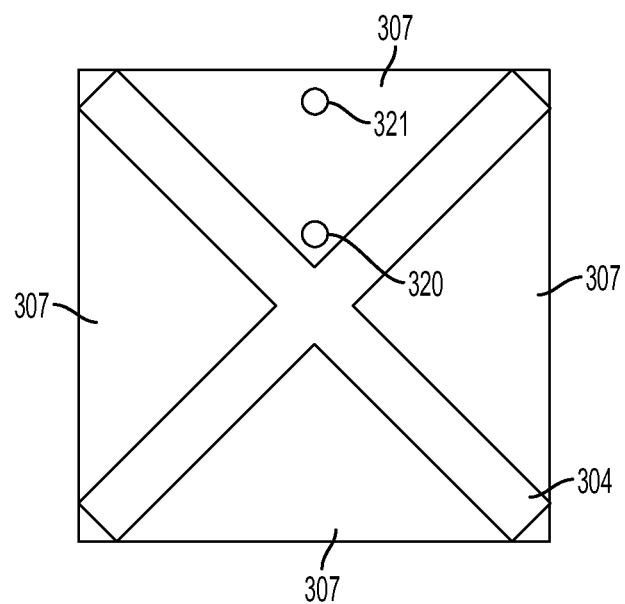
FIG. 3B is a side view of the second alternative injection guide of FIG. 3A after injection molding of a material.

FIG. 3A is an isometric view of a second alternative embodiment of an injection guide 304 that may be utilized in the insert molded split of FIG. 1A. As illustrated, the injection guide 304 is shaped like a X-beam. FIG. 3B is a side view of the injection guide 304 after injection molding of a material. As illustrated, strength point 321 may be formed away from the X-beam of the injection guide 304 and the weaker point 320 may be formed closer to the X-beam of the injection guide 304.

Figure 4A:
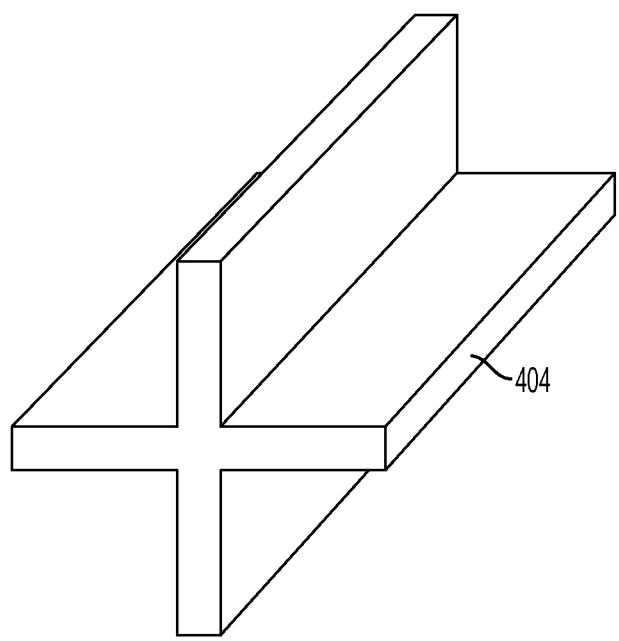
FIG. 4A is an isometric view of a third alternative embodiment of an injection guide that may be utilized in the insert molded split of FIG. 1A.
Figure 4B:
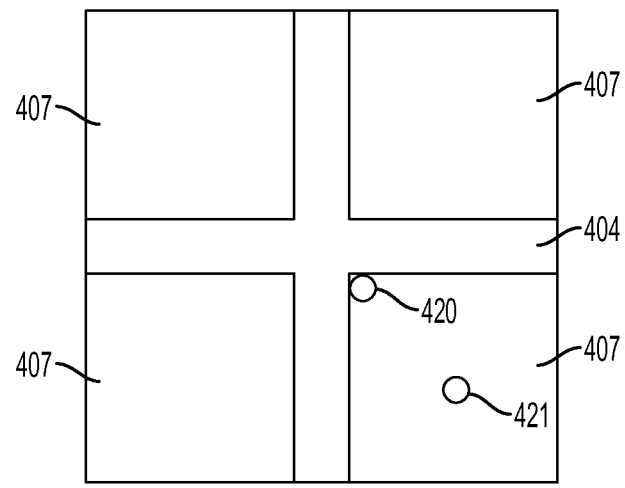
FIG. 4B is a side view of the third alternative injection guide of FIG. 4A after injection molding of a material.

FIG. 4A is an isometric view of a third alternative embodiment of an injection guide 404 that may be utilized in the insert molded split of FIG. 1A. As illustrated, the injection guide 404 is shaped like a cross-beam. FIG. 4B is a side view of the injection guide 404 after injection molding of a material. As illustrated, strength point 421 may be formed away from the cross-beam of the injection guide 404 and the weaker point 420 may be formed closer to the cross-beam of the injection guide 404.

Although the FIGS. 1A-4B have been illustrated and described as utilizing a single injection guide and connecting two housing elements, it is understood that this is an example. In various cases any number of injection guides (such as two or seven) may be utilized to connect any number of housing elements (such as three or twenty) without departing from the scope of the present disclosure.

Further, although the FIGS. 1A-4B have been illustrated and described as utilizing a single shot or a double shot injection molding process, it is understood that this is an example. In various implementations any number of shots may be utilized in injection molding the insert molded split 100 without departing from the scope of the present disclosure, such as three or fifteen.

Additionally, although the FIGS. 1A-4B have been illustrated and described as utilizing injection molding, it is understood that this is an example. In various implementations, other molding processes may be utilized instead of or in addition to injection molding, such as blow molding, compression molding, extrusion molding, rotation molding, thermoforming, and/or any other suitable kind of molding process.

Figure 5:
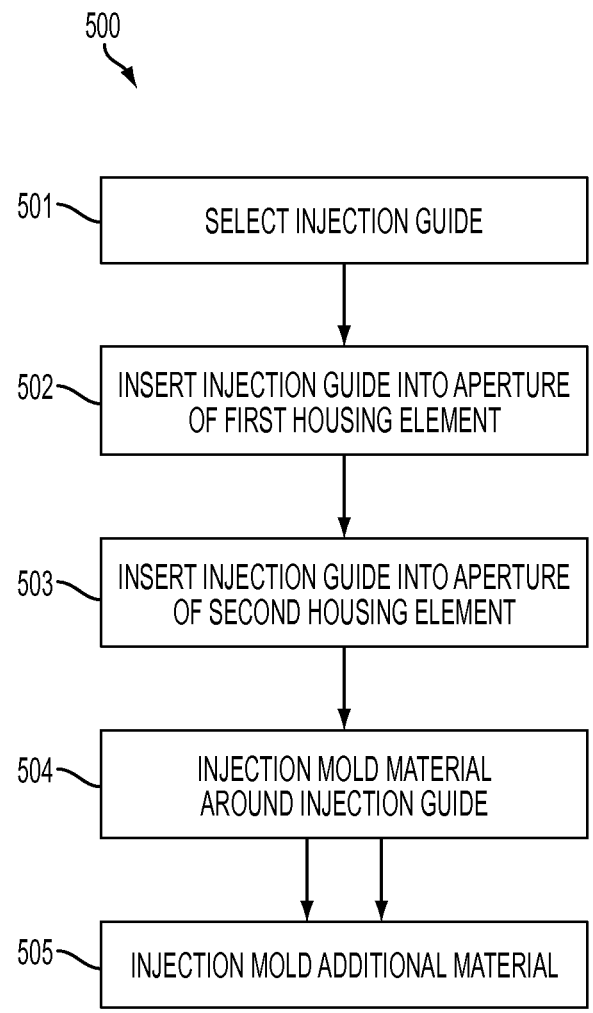
FIG. 5 is a method diagram illustrating a method for producing insert molded splits in housings. This method may produce the insert molded split illustrated in FIG. 1A.

FIG. 5 illustrates a method 500 for producing insert molded splits in housings. This method may produce the insert molded split illustrated in FIG. 1A.

The flow may begin at block 501 where an injection guide may be selected. The particular shape of an injection guide that is selected may be based on one or more strength points that will be formed as a result of using the shape in injection molding and one or more known stresses of a joint formed by the housing elements to be connected by a joint formed between housing elements using the injection guide.

The flow may then proceed to block 502 where at least a portion of the selected injection guide may be inserted into at least a first aperture of a first housing element. Next, the flow may proceed to block 503 where at least another portion of the selected injection guide may be inserted into at least a second aperture of a second housing element. The flow may then proceeds to block 504.

At block 504, material may be injection molded at least partially around or into the injection guide. This may form an insert molded split.

In some implementations, the method 500 may include an additional optional block 505. In such implementations, at block 505 additional material may be injection molded around the injection guide, the material, the first housing element, and/or the second housing element.

Although the method 500 is illustrated and described as including particular operations performed in a particular order, it is understood that this is an example. In one or more implementations, different configurations of the same, similar, and/or different operations may be performed without departing from the scope of the present disclosure.

For example, the method 500 illustrates and describes the operations 502 and 503 being performed in a linear sequence. However, in various implementations, the operations 502 and 503 may be performed simultaneously.

As described above and illustrated in the accompanying figures, the present disclosure discloses apparatuses and methods for producing insert molded splits in housings. A housing may include first and second housing elements coupled by an insert molded split. The insert molded split may include an injection guide that extends between a first aperture of the first housing element and a second aperture of the second housing element and material injection molded around the injection guide.

In a method for producing an insert molded split in a housing, an injection guide may be selected. The injection guide may be inserted into a first aperture of the first housing and the second aperture of the second housing. Material may then be injection molded into and/or at least partially around the injection guide to form the insert molded split.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may utilize a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

I claim:

1. A phone, comprising:
    a housing comprising:
        a first housing portion;
        a second housing portion; and
        a split coupling the first and second housing portions, the split comprising:
            a guide extending from the first and second housing portions; and
            fiber filled plastic injection molded around the guide;
                wherein the housing is positioned around a perimeter of a touch screen.

2. The phone of claim 1, wherein the guide is more rigid than the fiber filled plastic.

3. The phone of claim 1, wherein the fiber filled plastic includes fibers arranged in multiple orientations.

4. The phone of claim 1, wherein the guide includes an injection inlet port and an injection outlet port.

5. The phone of claim 1, further comprising a strength point in the fiber filled plastic and a weaker point in the fiber filled plastic wherein the weaker point is more proximate to the guide than the strength point.

6. The phone of claim 1, wherein the guide is filled by the fiber filled plastic.

7. The phone of claim 1, wherein the guide has a least one of a tube shape, an X-beam shape, a cross-beam shape, or an I-beam shape.

8. The phone of claim 1, wherein the fiber comprises at least one of glass fibers, plastic fibers, carbon fibers, or metallic fibers.

9. The phone of claim 1, wherein the fiber is oriented lengthwise between the first and second housing portions.

10. The phone of claim 1, wherein the fiber comprises a mesh.

11. The phone of claim 1, wherein a shape of the guide is associated with a strength point in the plastic and a known stress of the split.

12. The phone of claim 11, wherein the strength point in the plastic corresponds to the fiber.

13. The phone of claim 11, the fiber is straighter in orientation at the strength point than at a weaker point in the plastic associated with the shape of the guide.

14. The phone of claim 11, wherein the strength point is disposed closer to the guide than a weaker point in the plastic associated with the shape of the guide.

15. A phone, comprising:
    a touch screen having a perimeter;
    a housing positioned around the perimeter of the touch screen, the housing comprising:
        a first element;
        a second element; and
        an insert molded split, coupling the first and second elements, comprising:
            an injection guide extending between the first and second elements; and
            plastic injection molded around the injection guide, the plastic filled with fibers.

16. The phone of claim 15, wherein the housing forms an external surface of the phone.

17. The phone of claim 15, wherein the first and second elements form an external corner of the phone.

18. A phone, comprising:
    a housing positioned around a perimeter of a touch screen, the housing comprising:
        a first housing element having a first aperture;
        a second housing element having a second aperture; and
        an insert molded split comprising:
            an injection guide extending between the first and second apertures; and
            fiber filled plastic injection molded around the injection-guide.

19. The phone of claim 18, wherein the fiber is a rigid fiber.

20. The phone of claim 18, wherein the injection guide includes an injection inlet port and an injection outlet port.

* * * * *